US012452580B2

(12) United States Patent
Ren et al.

(10) Patent No.: US 12,452,580 B2
(45) Date of Patent: Oct. 21, 2025

(54) SPEAKER BOX AND ELECTRONIC DEVICE

(71) Applicant: AAC Microtech (Changzhou) Co., Ltd., Jiangsu (CN)

(72) Inventors: Li Ren, Changzhou (CN); Chaoyuan Li, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 166 days.

(21) Appl. No.: 18/395,780

(22) Filed: Dec. 26, 2023

(65) Prior Publication Data

US 2024/0340575 A1 Oct. 10, 2024

Related U.S. Application Data

(63) Continuation of application No. PCT/CN2023/086947, filed on Apr. 7, 2023.

(51) Int. Cl.
*H04R 1/28* (2006.01)

(52) U.S. Cl.
CPC ..... *H04R 1/2803* (2013.01); *H04R 2201/029* (2013.01); *H04R 2400/11* (2013.01)

(58) Field of Classification Search
CPC .......... H04R 1/2803; H04R 2201/0029; H04R 2400/11; H04R 2499/11; H04R 1/025
See application file for complete search history.

(56) References Cited

U.S. PATENT DOCUMENTS

2020/0045414 A1* 2/2020 Wu ...................... H04R 1/2842
2022/0417649 A1* 12/2022 Zheng .................... H04R 1/288
2024/0048913 A1* 2/2024 Cai ...................... H04R 1/2834

FOREIGN PATENT DOCUMENTS

CN 109714677 * 5/2019

* cited by examiner

*Primary Examiner* — Jason Chan
(74) *Attorney, Agent, or Firm* — Wiersch Law Group

(57) ABSTRACT

A speaker box and an electronic device are disclosed. The speaker box includes an upper cover plate including side walls, a first lower cover plate, a speaker unit, a motor module, and second lower cover plates. The speaker unit divides an accommodating cavity defined by upper cover plate and first lower cover plate into front and back cavities. The second lower cover plates are assembled with the upper cover plate to define compensation cavities. A length of at least one of the side walls of the upper cover plate is greater than that of an orthographic projection thereof, so the speaker box is suitable for various electronic devices and has strong adaptability and wide application. The compensation cavities are communicated with the back cavity, which increases an overall space of the back cavity, improves low-frequency performance of the speaker unit, and improves sound production effect of the speaker unit.

10 Claims, 4 Drawing Sheets

SPEAKER BOX AND ELECTRONIC DEVICE

TECHNICAL FIELD

The present disclosure relates to a technical field of electroacoustic device, and in particular to a speaker box and an electronic device.

BACKGROUND

As shown in FIGS. 1-2, a speaker box in the prior art is regular in appearance. A tail cavity 17 is disposed on one side thereof. An upper cover bracket 12 and an upper cover steel sheet 11 are fixed through glue and assembled with a speaker unit 13. A motor module 14 and a tail cavity cover plate 15 are fixed to the upper cover steel sheet 11 through gluing. Gaps between the motor module 14 and the upper cover bracket 12 and gaps between the motor module 14 and the tail cavity 17 are sealed through glue. This sealing method is more suitable for speaker boxes with regular appearance, such as standard speaker boxes, metal speaker boxes, and so on. Conventional standard speaker box structures have a small application range and cannot be suitable for speaker boxes with irregular appearance.

Aiming at above problems, it is necessary to provide a speaker box and an electronic device that are reasonable in design and effectively improve the above problems.

SUMMARY

The present disclosure aims to solve at least one of the technical problems in the prior art and provides a speaker box and an electronic device.

A first aspect of the present disclosure provides the speaker box including an upper cover plate, a first lower cover plate, a speaker unit, and a motor module. The first lower cover plate is assembled with the upper cover plate to define an accommodating cavity. The speaker unit and the motor module are accommodated in the accommodating cavity. The speaker unit divides the accommodating cavity into a front cavity and a back cavity. The motor module is disposed on one side, distal from the upper cover plate, of the speaker unit. The upper cover plate includes a top wall and side walls. A length of at least one of the side walls is greater than a length of an orthographic projection of the at least one of the side walls. The speaker box further includes second lower cover plates. The second lower cover plates are respectively assembled with edge areas of the upper cover plate to define compensation cavities. The compensation cavities are communicated with the back cavity.

In one embodiment, the upper cover plate includes first side walls and second side walls. The first side walls are opposite to each other along a length direction of the upper cover plate. The second side walls are opposite to each other along a width direction of the upper cover plate.

A length of each of the second side walls is greater than a length of a projection of each of the second side walls.

In one embodiment, supporting steps are disposed at one end, facing the second lower cover plates, of the side walls of the upper cover plate.

Each of the second lower cover plates includes a bottom wall and side walls of the second lower cover plates connected to the bottom wall. Bosses are disposed at one end, facing the upper cover plate, of the side walls of the second lower cover plates.

Each of the bosses is embedded in a corresponding supporting step of the supporting steps.

In one embodiment, the second lower cover plates are fixed to the edge areas of the upper cover plate through ultrasonic welding.

In one embodiment, the compensation cavities are communicated with each other.

In one embodiment, the speaker box further includes mounting holes.

The mounting holes are defined on the edge areas of the upper cover plate and are located on outer sides of the compensation cavities.

The mounting holes are configured to fix the speaker box to an electronic device.

In one embodiment, a mounting groove is defined on one side, facing the speaker unit, of the upper cover plate. The speaker unit is accommodated in the mounting groove. The mounting groove and the upper cover plate are of an injection molding integrated structure.

In one embodiment, the motor module includes a housing. The housing of the motor module is served as the first lower cover plate.

In one embodiment, sealing strips are disposed at gaps between the first lower cover plate and the second lower cover plates and gaps between the first lower cover plate and the upper cover plate.

A second aspect of the present disclosure provides the electronic device, including the speaker box as previously described.

The present disclosure provides the speaker box and the electronic device. The speaker box includes: the upper cover plate, the first lower cover plate, the speaker unit, and the motor module. The first lower cover plate is assembled with the upper cover plate to define the accommodating cavity. The speaker unit and the motor module are accommodated in the accommodating cavity. The speaker unit divides the accommodating cavity into the front cavity and the back cavity. The motor module is disposed on the one side, distal from the upper cover plate, of the speaker unit. The upper cover plate includes the top wall and the side walls. The length of the at least one of the side walls is greater than the length of the orthographic projection of the at least one of the side walls. The speaker box further includes the second lower cover plates. The second lower cover plates are respectively assembled with the edge areas of the upper cover plate to define the compensation cavities. The compensation cavities are communicated with the back cavity. According to the speaker box disclosed by the present disclosure, the length of the at least one of the side walls of the upper cover plate of the speaker box is greater than the length of the orthographic projection of the at least one of the side walls of the upper cover plate of the speaker box. That is, the upper cover plate has an irregular shape and is suitable for speaker boxes with different shapes, thereby being suitable for various electronic devices and having strong adaptability and wide application. The second lower cover plates are respectively assembled with the edge areas of the upper cover plate to define the compensation cavities. The compensation cavities are communicated with the back cavity. The compensation cavities increase an overall space of the back cavity, improving low-frequency performance of the speaker unit, and thus improving sound production effect of the speaker unit.

DETAILED DESCRIPTION

In order to enable a person skilled in art to better understand technical solutions of embodiments of the present disclosure, the embodiments of the present disclosure are described in further details below in conjunction with accompanying drawings and specific embodiments.

Figure 1:
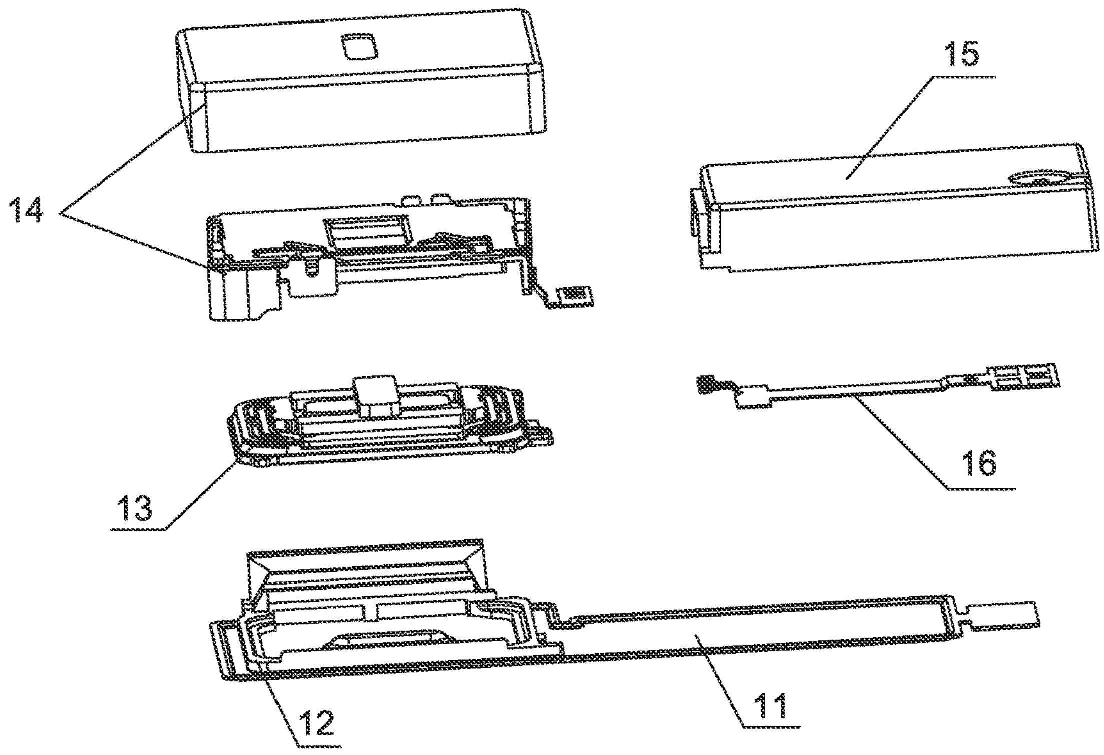
FIG. 1 Prior Art
FIG. 1 is an exploded perspective schematic diagram of a speaker box in the prior art.
Figure 2:
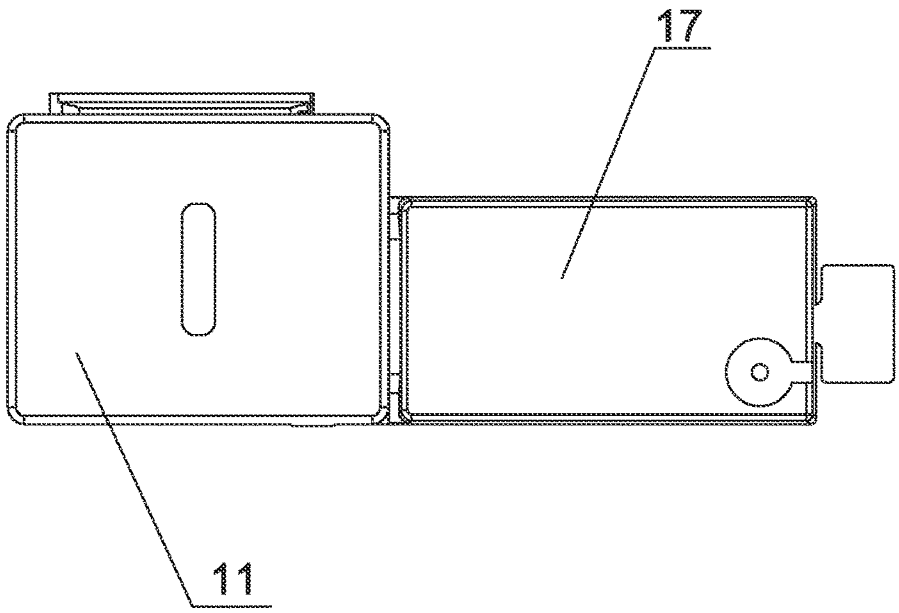
FIG. 2 Prior Art
FIG. 2 is an overall structural schematic diagram of the speaker box in the prior art.
Figure 3:
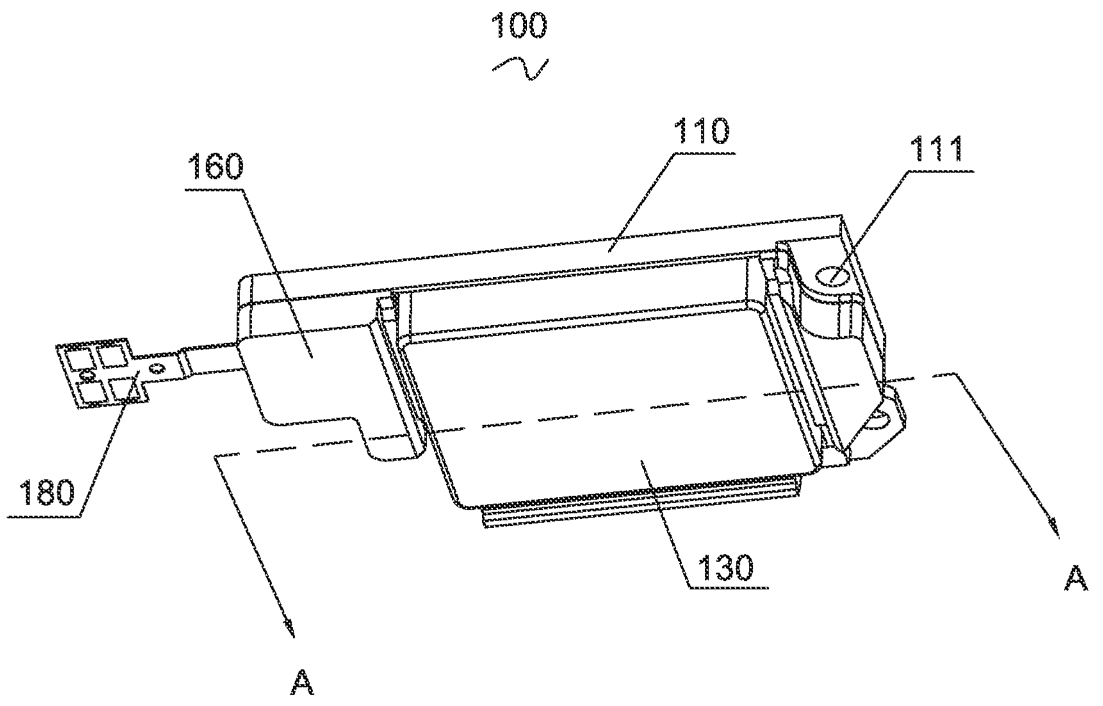
FIG. 3 is an overall structural schematic diagram of a speaker box according to one embodiment of the present disclosure.
Figure 4:
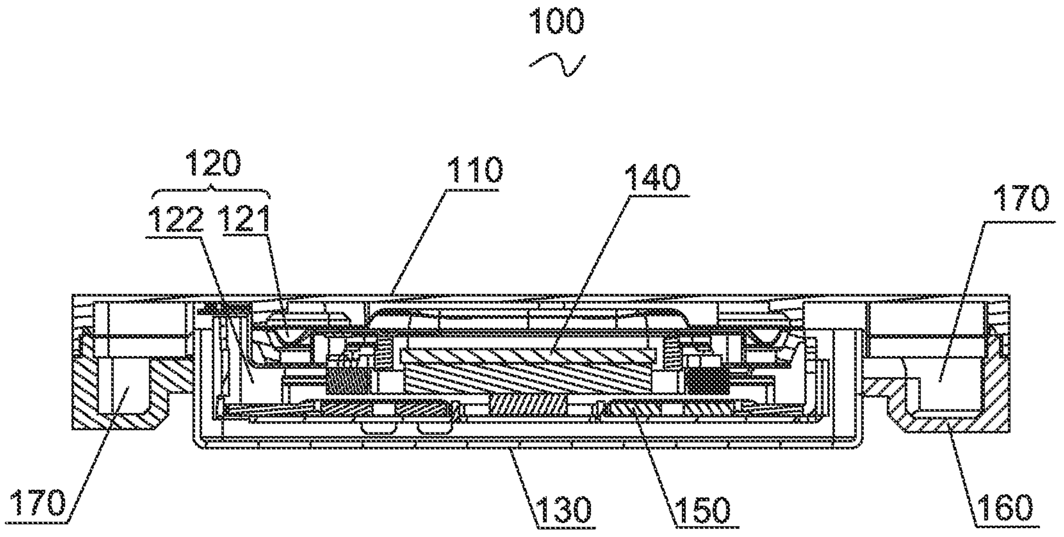
FIG. 4 is a cross-sectional schematic diagram of the speaker box taken along the line A-A shown in FIG. 1.
Figure 5:
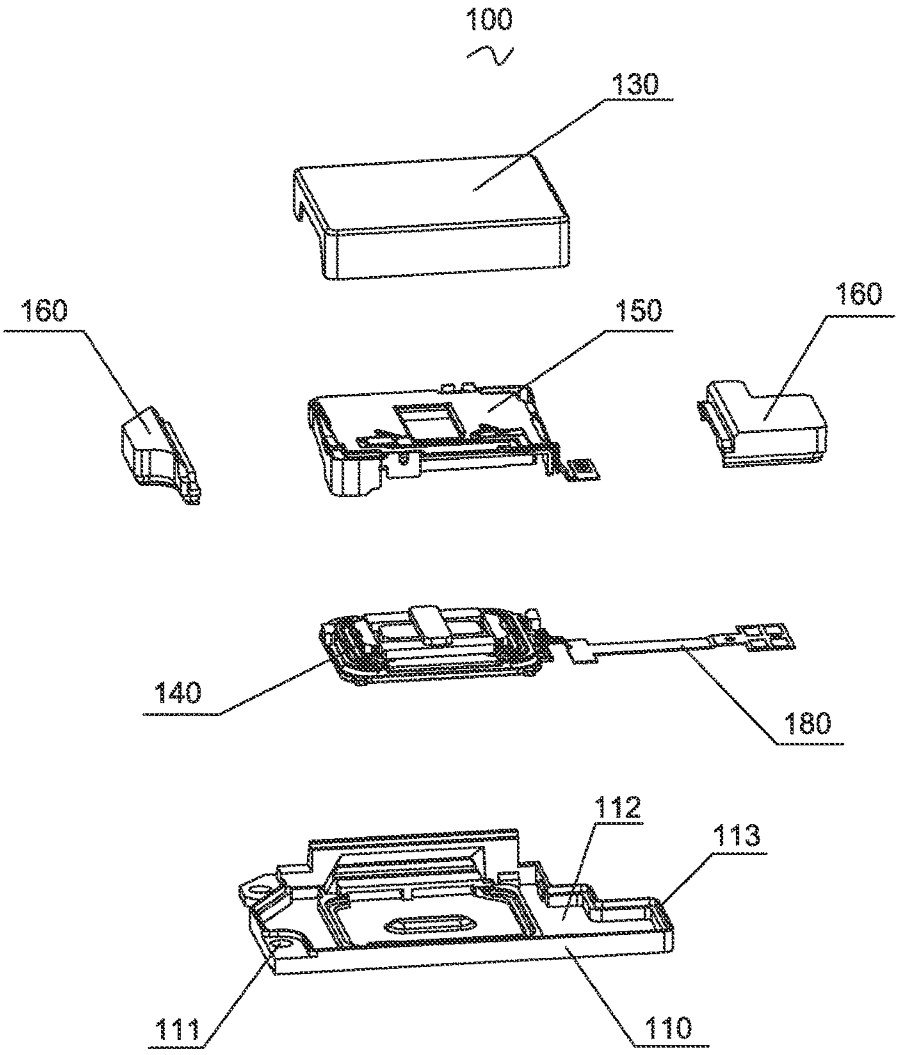
FIG. 5 is an exploded perspective schematic diagram of the speaker box shown in FIG. 1.

As shown in FIG. 3, FIG. 4, and FIG. 5, a first aspect of the present disclosure provides a speaker box 100 including an upper cover plate 110, a first lower cover plate 130, a speaker unit 140, and a motor module 150. The first lower cover plate 130 is assembled with the upper cover plate 110 to define an accommodating cavity 120. The speaker unit 140 and the motor module 150 are accommodated in the accommodating cavity 120. The speaker unit 140 divides the accommodating cavity 120 into a front cavity 121 and a back cavity 122. The motor module 150 is disposed on one side, distal from the upper cover plate 110, of the speaker unit 140. The upper cover plate 110 includes a top wall 112 and side walls 113. A length of at least one of the side walls 113 is greater than a length of an orthographic projection of the at least one of the side walls 113. That is, a shape of the upper cover plate 110 is not a rectangle as that in the prior art, and at least one of the side walls 113 of the upper cover plate 110 is irregularly shaped.

The speaker box 100 further includes second lower cover plates 160. The second lower cover plates 160 are respectively assembled with edge areas of the upper cover plate 110 to define compensation cavities 170. The compensation cavities 170 are communicated with the back cavity 122. That is, shapes of the second lower cover plates 160 are matched with the shape of the upper cover plate 110.

Figure 6:
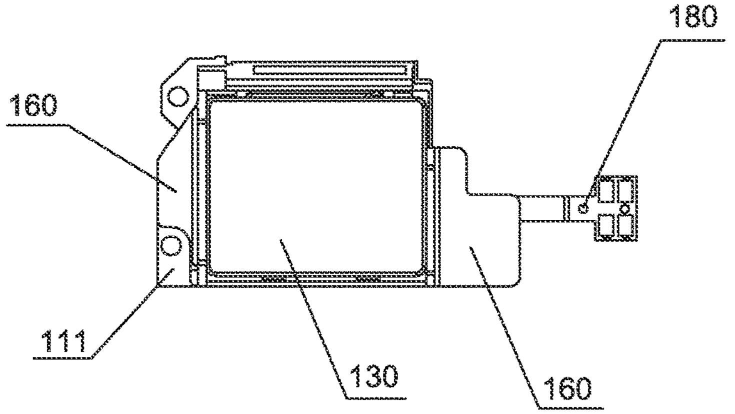
FIG. 6 is an elevational schematic diagram of the speaker box according to another embodiment of the present disclosure.

It should be noted that in the embodiment, as shown in FIGS. 5-6, the number of the second lower cover plates 160 is two, and the two lower cover plates 160 are respectively covered on two sides along a length direction of the upper cover plate 110 (i.e. a left side and a right side of the speaker box 100 in FIGS. 5-6). The number and shapes of the second lower cover plates 160 are not limited, which are selected according to actual needs.

In other words, according to a shape of an electronic device including the speaker box 100, at least one of the side walls 113 of the upper cover plate 110 of the speaker box 100 is set to have a length thereof greater than a length of an orthographic projection thereof. That is, the edge areas of the upper cover plate 110 are in irregular shapes. In this way, after the upper cover plate 110 and the first lower cover plate 130 are assembled, an extra space other than the speaker unit 140 and the motor module 150 is inevitably present, that is, the edge areas of the upper cover plate 110 have extra spaces. According to the shapes of the edge areas of the upper cover plate 110, the extra spaces of the edge areas of the upper cover plate 110 and the second lower cover plates 160 are assembled to define the compensation cavities 170, and the compensation cavities 170 are communicated with the back cavity 122.

According to the speaker box disclosed by the present disclosure, the length of the at least one of the side walls of the upper cover plate of the speaker box is greater than the length of the orthographic projection of the at least one of the side walls of the upper cover plate of the speaker box. That is, the upper cover plate has an irregular shape and is suitable for speaker boxes with different shapes, thereby being suitable for various electronic devices and having strong adaptability and wide application. The second lower cover plates are respectively assembled with the edge areas of the upper cover plate to define the compensation cavities. The compensation cavities are communicated with the back cavity. The compensation cavities increase an overall space of the back cavity, improving low-frequency performance of the speaker unit, and thus improving sound production effect of the speaker unit.

Figure 7:
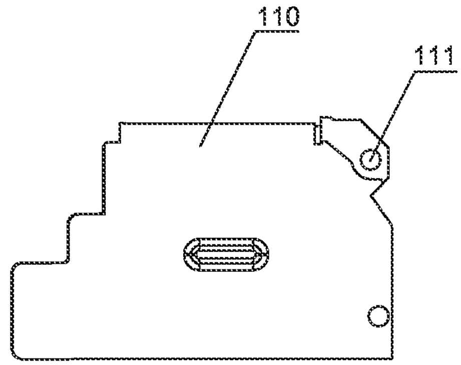
FIG. 7 is an elevational schematic diagram of an upper cover plate according to another embodiment of the present disclosure.
Figure 8:
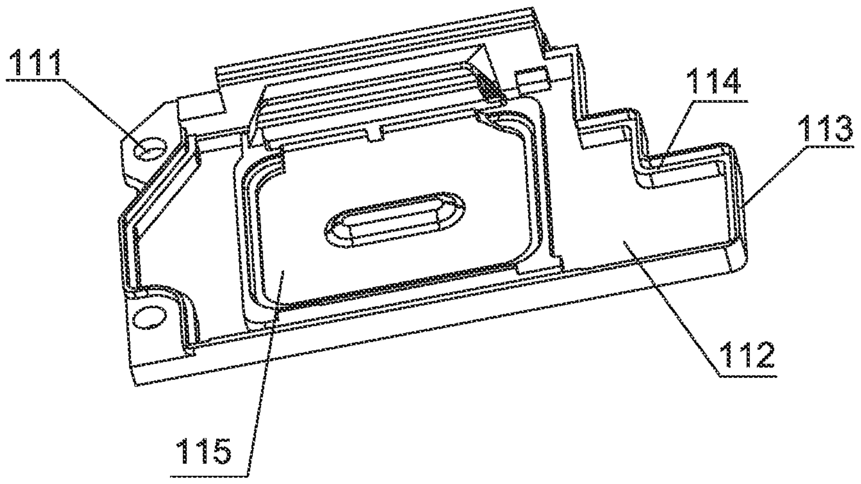
FIG. 8 is a perspective schematic diagram of the upper cover plate according to another embodiment of the present disclosure.

In one optional embodiment, as shown in FIGS. 7-8, the upper cover plate 110 includes first side walls and second side walls. The first side walls are opposite to each other along a length direction of the upper cover plate 110. The second side walls are opposite to each other along a width direction of the upper cover plate 110. A length of each of the second side walls is greater than a length of a projection thereof. That is to say, in the embodiment, only the second side walls opposite to each other along the width direction of the upper cover plate 110 are in irregular shapes.

Specifically, as shown in FIGS. 7-8, in the present embodiment, one of the second side walls of the upper cover plate 110 is in a stepped shape recessed towards the speaker unit 140, and the other one of the second side walls of the upper cover plate 110 is recessed towards the speaker unit 140 to define an included angle.

It should be noted that in the present embodiment, specific shapes of the side walls 113 of the upper cover plate 110 are not specifically limited, which are selected according to specific shape of the electronic device (such as a mobile phone) configured to bear the speaker box 100. For example, a shape of the speaker box 100 is set according to a shape of a housing of the mobile phone, that is, the shapes of the side walls 113 of the upper cover plate 110 are set according to the shape of the housing of the mobile phone.

In one optional embodiment, as shown in FIG. 8, the upper cover plate 110 includes the top wall 112 and the side walls 113 connected to the top wall 112. Supporting steps 114 are disposed at one end, facing the second lower cover plates 160, of the side walls 113 of the upper cover plate 110.

Figure 9:
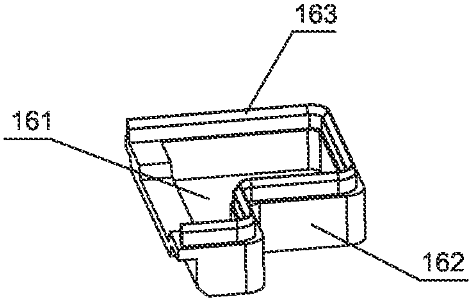
FIG. 9 is a perspective schematic diagram of a second lower cover plate according to another embodiment of the present disclosure.

As shown in FIG. 9, each of the second lower cover plates 160 includes a bottom wall 161 and side walls 162 connected to the bottom wall 161. In the embodiment, shapes of the side walls 162 of the second lower cover plates 160 are matched with the shapes of the edge areas of the upper cover plate 110. Bosses 163 are disposed at one end, facing the upper cover plate 110, of the side walls 162 of the second lower cover plates 160. Each of the bosses 163 is embedded in a corresponding supporting step of the supporting steps 114.

In the above embodiment, the second lower cover plates 160 are embedded in the supporting steps 114 disposed on the side walls 113 of the upper cover plate 110 through the bosses 163 on the side walls 162 of the second lower cover plates 160. On one hand, dust and the like are prevented from falling into the compensation cavities, and on the other hand, spaces of the compensation cavities 170 are increased, thus increasing the overall space of the back cavity 122, and further improving the low-frequency performance of the speaker unit.

In one optional embodiment, the second lower cover plates 160 are fixed to the edge areas of the upper cover plate 110 through ultrasonic welding.

In the embodiment, after the second lower cover plates 160 are embedded in the supporting steps 114 on the side walls 113 of the upper cover plate 110 through the bosses 163 on the side walls 162 of the second lower cover plates 160, fixing the second lower cover plates 160 to the edge areas of the upper cover plate 110 through ultrasonic welding, so that the second lower cover plates 160 are more reliably fixed to the edge areas of the upper cover plate 110, thus further improving reliability of the speaker box 100, and making operation process simple.

In one embodiment, in the embodiment, the compensation cavities 170 are communicated with each other.

In the above embodiment, the compensation cavities 170 are communicated with each other, so that the overall space of the back cavity 122 is further increased, thus further improving the low-frequency performance of the speaker unit.

In one optional embodiment, as shown in FIGS. 5-8, the speaker box 100 further includes mounting holes 111. The mounting holes 111 are defined on the edge areas of the upper cover plate 110 and are located on outer sides of the compensation cavities 170. The mounting holes 111 are configured to fix the speaker box 100 to the electronic device.

It should be noted that in the embodiment, the mounting holes 111 are screw holes or other types of mounting holes, which are not specifically limited. The number, shapes, sizes, and other parameters of the mounting holes 111 are not specifically limited, and are determined according to the shapes, the sizes, and the like of the electronic device (such as the housing of the mobile phone).

In the above embodiment, the mounting holes 111 are defined on the upper cover plate 110, so that the speaker box 100 is fixed to the electronic device, such as the housing of the mobile phone and the like, which are suitable for electronic devices in various shapes, and improve adaptability of the speaker box 100.

For example, as shown in FIG. 8, a mounting groove 115 is defined on one side, facing the speaker unit 140, of the upper cover plate 110. The speaker unit 140 is accommodated in the mounting groove 115. The mounting groove 115 and the upper cover plate 110 are of an injection molding integrated structure. Furthermore, the mounting holes 111, the mounting groove 115, and the upper cover plate 110 are an injection molding integrated structure. In other words, the mounting holes 111, the mounting groove 115, or other complex structures are integrally formed on the upper cover plate 110. Furthermore, in the embodiment, the mounting groove 115 and the upper cover plate 110 are an integrally injection-molded steel sheet.

In the embodiment, the mounting groove 115 and the upper cover plate 110 are of an injection molding integrated structure, and are capable of being integrated on an integrated module, which is simple in structure and convenient to install.

In one optional embodiment, as shown in FIG. 5, in the present embodiment, the first lower cover plate 130 is served as a housing of the motor module 150. In other words, in the embodiment, the housing of the motor module 150 and the upper cover plate 100 are assembled to defined the accommodating cavity 120.

In the embodiment, the motor module 150 includes the housing. The housing of the motor module 150 is served as the first lower cover plate 130.

In the above embodiment, the housing of the motor module 150 is served as the first lower cover plate 130, and no separate first lower cover plate 130 needs to be additionally added, thus reducing a height space occupied by the speaker box 100, and meeting requirements for miniaturization of the electronic devices.

In one optional embodiment, as shown in FIG. 6, sealing strips are disposed at gaps between the first lower cover plate 130 and the second lower cover plates 160 and gaps between the first lower cover plate 130 and the upper cover plate 110, where the sealing strips are not shown in the figures. In the embodiment, the sealing strips are made from sealing glue, certainly, other materials are adopted for the sealing strips, which are not specifically limited.

According to the above embodiment, the sealing strips are disposed at the gaps between the first lower cover plate 130 and the second lower cover plates 160 and the gaps between the first lower cover plate 130 and the upper cover plate 110, thus improving sealing performance between the first lower cover plate 130 and the second lower cover plates 160, sealing performance between the first lower cover plate 130 and the upper cover plate 110, and then improving sealing performance of the speaker box 100.

For example, as shown in FIG. 3, FIG. 5, FIG. 6, the speaker box 100 further includes a circuit board 180. A first end of the circuit board 180 is electrically connected to the speaker unit 140 and the motor module 150. A second end of the circuit board 180 is configured to be electrically connected to an external circuit. In the embodiment, the circuit board 180 is a flexible circuit board.

In the above embodiment, the speaker unit 140 and the motor module 150 are electrically connected to the external circuit through the circuit board 180, so that sound generation of the speaker unit 140 and vibration of the motor module 150 are respectively realized.

On the other hand, the embodiment of the present disclosure provides the electronic device including the speaker box 100 as previously described. Specific structure of the speaker box 100 has been described in details and is not further elaborated herein. Specifically, the electronic device is a mobile phone, a tablet computer, a notebook computer, and the like.

The electronic device in this embodiment adopts the speaker box described earlier. According to the speaker box disclosed by the present disclosure, the length of the at least one of the side walls of the upper cover plate of the speaker box is greater than the length of the orthographic projection of the at least one of the side walls of the upper cover plate of the speaker box. That is, the upper cover plate has an irregular shape, thereby being suitable for various electronic devices and having strong adaptability and wide application. The second lower cover plates are respectively assembled with the edge areas of the upper cover plate to define the compensation cavities. The compensation cavities are communicated with the back cavity, thus increasing the overall space of the back cavity, improving the low-frequency performance of the speaker unit, improving the sound production effect of the speaker unit, improving the sound production effect of the electronic device, and improving use experience of a user.

It is understood that the above embodiments are merely exemplary embodiments configured to illustrate principles of the embodiments of the present disclosure, but the embodiments of the present disclosure are not limited thereto. For the person of ordinary skill in the art, various modifications and improvements can be made without departing from spirit and essence of the embodiments of the present disclosure, and these variations and improvements are further considered to be within a protection scope of the embodiments of the present disclosure.

What is claimed is:

1. A speaker box, comprising:

an upper cover plate;

a first lower cover plate;

a speaker unit; and a motor module;

wherein the first lower cover plate is assembled with the upper cover plate to define an accommodating cavity, the speaker unit and the motor module are accommodated in the accommodating cavity, the speaker unit divides the accommodating cavity into a front cavity and a back cavity; the motor module is disposed on one side, distal from the upper cover plate, of the speaker unit; the upper cover plate comprises a top wall and side walls, a length of at least one of the side walls is greater than a length of an orthographic projection of the at least one of the side walls, the speaker box further comprises second lower cover plates, the second lower cover plates are respectively assembled with edge areas of the upper cover plate to define compensation cavities, and the compensation cavities are communicated with the back cavity.

2. The speaker box according to claim 1, wherein the upper cover plate comprises first side walls and second side walls, the first side walls are opposite to each other along a length direction of the upper cover plate, the second side walls are opposite to each other along a width direction of the upper cover plate, and a length of each of the second side walls is greater than a length of a projection of each of the second side walls.

3. The speaker box according to claim 1, wherein supporting steps are disposed at one end, facing the second lower cover plates, of the side walls of the upper cover plate;

each of the second lower cover plates comprises a bottom wall and side walls of the second lower cover plates connected to the bottom wall, and bosses are disposed at one end, facing the upper cover plate, of the side walls of the second lower cover plates; and each of the bosses is embedded in a corresponding supporting step of the supporting steps.

4. The speaker box according to claim 1, wherein the second lower cover plates are fixed to the edge areas of the upper cover plate through ultrasonic welding.

5. The speaker box according to claim 1, wherein the compensation cavities are communicated with each other.

6. The speaker box according to claim 1, wherein the speaker box further comprises mounting holes;

the mounting holes are defined on the edge areas of the upper cover plate and are located on outer sides of the compensation cavities; and the mounting holes are configured to fix the speaker box to an electronic device.

7. The speaker box according to claim 1, wherein a mounting groove is defined on one side, facing the speaker unit, of the upper cover plate; the speaker unit is accommodated in the mounting groove, and the mounting groove and the upper cover plate are of an injection molding integrated structure.

8. The speaker box according to claim 1, wherein the motor module comprises a housing, and the housing of the motor module is served as the first lower cover plate.

9. The speaker box according to claim 1, wherein sealing strips are disposed at gaps between the first lower cover plate and the second lower cover plates and gaps between the first lower cover plate and the upper cover plate.

10. An electronic device, comprising the speaker box according to claim 1.

* * * * *